United States Patent
Gao et al.

(10) Patent No.: US 9,533,259 B2
(45) Date of Patent: Jan. 3, 2017

(54) METHOD FOR REGENERATING SCR DENITRATION CATALYST ASSISTED BY MICROWAVES AND DEVICE THEREFOR

(71) Applicant: ZHEJIANG UNIVERSITY, Hangzhou, Zhejiang Province (CN)

(72) Inventors: Xiang Gao, Hangzhou (CN); Zhongyang Luo, Hangzhou (CN); Kefa Cen, Hangzhou (CN); MingJiang Ni, Hangzhou (CN); Hao Song, Shaoxing (CN); Weihong Wu, Hangzhou (CN); Hongmin Yu, Hangzhou (CN); Zhenglun Shi, Hangzhou (CN); Jinsong Zhou, Hangzhou (CN); Mengxiang Fang, Hangzhou (CN); Chunjiang Yu, Hangzhou (CN); Shurong Wang, Hangzhou (CN); Lemin Cheng, Hangzhou (CN); Qinhui Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 15/028,373

(22) PCT Filed: Oct. 9, 2013

(86) PCT No.: PCT/CN2013/084859
§ 371 (c)(1),
(2) Date: Apr. 8, 2016

(87) PCT Pub. No.: WO2015/051502
PCT Pub. Date: Apr. 16, 2015

(65) Prior Publication Data
US 2016/0256824 A1 Sep. 8, 2016

(51) Int. Cl.
*C01B 31/08* (2006.01)
*B01D 53/96* (2006.01)
*B01F 3/04* (2006.01)
*B01J 38/00* (2006.01)
*B01J 38/02* (2006.01)
*B01J 38/48* (2006.01)
*B01J 38/52* (2006.01)
*B01D 53/86* (2006.01)

(52) U.S. Cl.
CPC ............ *B01D 53/96* (2013.01); *B01F 3/0412* (2013.01); *B01F 3/04106* (2013.01); *B01F 3/04439* (2013.01); *B01J 38/00* (2013.01); *B01J 38/02* (2013.01); *B01J 38/48* (2013.01); *B01J 38/52* (2013.01); *B01D 53/8625* (2013.01); *B01D 2257/40* (2013.01); *B01F 2003/04156* (2013.01); *B01F 2003/04234* (2013.01); *B01F 2003/04865* (2013.01); *B01F 2003/04943* (2013.01)

(58) Field of Classification Search
CPC ............................... C01B 31/08; C01B 31/088
USPC .......................................................... 502/56
See application file for complete search history.

(56) References Cited

U.S. PATENT DOCUMENTS

2012/0270725 A1   10/2012   Chen et al.

FOREIGN PATENT DOCUMENTS

CN   102266723 A   12/2011
CN   102489107 A   6/2012

OTHER PUBLICATIONS

Cui, Liwen; "Experimental Research on V205-W03/Ti02 SCR Catalyst Regeneration" Master's Dissertation of Zhejiang University, Feb. 15, 2013, p. 14, paragraph 3.

*Primary Examiner* — Edward Johnson
(74) *Attorney, Agent, or Firm* — Jiwen Chen

(57) ABSTRACT

Disclosed is a method for regenerating a SCR denitration catalyst assisted by microwaves. The method comprises: (1) a poisoned SCR denitration catalyst is immersed in deionized water, and the SCR denitration catalyst is cleaned by a bubbling method; (2) the SCR denitration catalyst is transferred to a container containing a pore-expanding solution for a soaking treatment; (3) the SCR denitration catalyst is transferred to a microwave device and treated for 1-10 minutes; (4) the SCR denitration catalyst is transferred to a container with an activating liquid and impregnated for 1-4 hours; (5) the SCR denitration catalyst is dried with microwaves for 1-20 minutes; and (6) the SCR denitration catalyst is calcined under conditions of 500-600° C. for 4-7 hours. The present invention has readily available raw materials, is simple and energy-saving in device and process, and is suitable for industrial scale regeneration. The catalyst treated by the method of the present invention has the advantages of loose pore channels, obviously optimized pore structures, significantly improved catalyst surface conditions, high activity, and good economic benefits.

17 Claims, 1 Drawing Sheet

METHOD FOR REGENERATING SCR DENITRATION CATALYST ASSISTED BY MICROWAVES AND DEVICE THEREFOR

This is a U.S. national stage application of PCT Application No. PCT/CN2013/084859 under 35 U.S.C. 371, filed Oct. 9, 2013 in Chinese, which is hereby incorporated by reference.

FIELD OF THE INVENTION

The present invention relates to a method for regenerating a catalyst, especially a method for regenerating selective catalytic reduction (SCR) denitration catalyst assisted by microwaves and device therefor.

BACKGROUND OF THE INVENTION

Since the 1990s, the State Environmental Protection Administration has put restrictions on the NOx emission from coal-fired power plant boiler (GB 13223-1991) and continuously tightened the emission limit in successive Emission Standard of Air Pollutants for Thermal Power Plants (GB 13223-1996 and GB 13223-2003). According to the latest Emission Standard of Air Pollutants for Thermal Power Plants (GB 13223-2011) released in July 2011, NOx emission from newly-built, expanded and rebuilt coal-fired power plant must meet the limit of 100 mg/m$^3$ (key regions) and 200 mg/m$^3$ (other regions) from Jan. 1, 2012, and all coal-fired power plants completed as of Jan. 1, 2014 must meet the aforesaid standards. In a mature SCR flue gas denitrification technology with high efficiency, catalyst is an important part in the SCR system and its performances will directly affect the denitration effect of the catalyst. Being easily blocked and poisoned, it is inevitable that a catalyst will lose activity during use and inactive catalyst usually will be regenerated for reuse to reduce the cost and the waste stacking space. Therefore, solving the problem of catalyst regeneration will improve the actual emission reduction effect and greatly improve the economy of SCR technology.

Based on the active site theory in catalytic reaction kinetics, catalytic reaction occurs at the active site on catalyst surface and larger specific surface area can offer more surface active sites. Besides, the richer the micropore structure is, the larger the specific surface area is. In terms of pore channel structure, within the scope adaptive to SCR reaction, larger pore volume means larger reaction gas volume contained in the pore structure, which is also beneficial to the catalytic reaction.

In microwave heating technology, high-frequency reciprocating motions of dipole molecules inside the heated object generate "internal friction heat" and cause internal and external heating and temperature rise at the same time without any heat conduction process. With a quick and even heating speed, it requires only a small percentage of energy consumption required by the traditional heating method, and hence has a good development prospect in terms of catalyst regeneration.

After searching existing technical literatures, a Chinese patent CN1686607A discloses a filter unit for regenerating active carbon with microwaves and ultrasonic waves. Fluid flows into a filter via an inlet on a casing cover, runs through active carbon filled in the casing body for filtration and flows out of the filter along a pipe in the active carbon via an outlet on the casing cover. If the active carbon is inactive and needs to be regenerated, the fluid flows into the outlet and flows out of the inlet and microwave irradiation and ultrasonic waves will regenerate the active carbon when turning on the microwave generator and ultrasonic generator, and the fluid will bring out impurities from the regeneration process. Since the regeneration process of denitration catalyst cannot directly occur on site and requires the cleaning and impregnating with various solutions in different containers, SCR process and regeneration process cannot occur in the same container, and method of such patent is unsuitable for regenerating SCR denitration catalyst.

Chinese patent CN1686607A discloses a method for regenerating denitration catalyst by selective catalytic reduction and device therefor. In such regeneration method, poisoned SCR denitration catalyst after actual industrial application successively undergo ultrasonic pretreatment, cleaning with deionized water, impregnating with pore-expanding solution, high-temperature high-pressure evaporation, activating with active material and calcining process, so as to be regenerated for reuse. Such method has certain dangers due to high pressure of the autoclave used; causes waste of the pore-expanding solution like absolute ethyl alcohol; requires ultrasonic cleaning with deionized water for 10 minutes, still standing for 2-3 hours and maintenance under high temperature in the autoclave for a period of time; and requires complete drying of activating liquid after pore-expanding and drying under 105-130° C. for 4-8 hours. Such method takes a long time and great energy consumption due to restriction of the instrument and temperature.

SUMMARY OF THE INVENTION

The present invention discloses a method for regenerating a SCR denitration catalyst assisted by microwaves, and the method has readily available raw materials, is simple and energy-saving in device and process, and is suitable for industrial scale regeneration. The catalyst treated by the method of the present invention has the advantages of loose pore channels, obviously optimized pore structures, significantly improved catalyst surface conditions, high activity, and good economic benefits.

The present invention also discloses a device for the method for regenerating a SCR denitration catalyst assisted by microwaves.

Technical solution for solving problem in the present invention is as follows:

A method for regenerating a SCR denitration catalyst assisted by microwaves, comprising:
(1) immersing a poisoned SCR denitration catalyst in deionized water, and cleaning the SCR denitration catalyst by a bubbling method for 10-30 minutes;
(2) transferring the SCR denitration catalyst from step (1) to a container containing a pore-expanding solution and conducting a soaking treatment for 10-30 minutes;
(3) transferring the SCR denitration catalyst from step (2) to a microwave device and treating the catalyst for 1-10 minutes;
(4) transferring the SCR denitration catalyst from step (3) to a container with an activating liquid and impregnating the catalyst for 1-4 hours;
(5) transferring the SCR denitration catalyst from step (4) to a microwave device and drying the catalyst for 1-20 minutes;
(6) transferring SCR denitration catalyst from step (5) to a calcining device and calcining the catalyst under conditions of 500-600° C. for 4-7 hours.

Since it is difficult to solve the problem of micropore blockage during use of catalyst, the present invention discloses a method for increasing the specific surface area, increasing pores of different sizes and optimizing pore channel structure of catalyst, so as to increase the impregnated activating liquid and make the loading of active material even. Thereby, the catalyst obtained has high activity and good economic benefits.

In the present invention, microwave treatment (step 3) is added after pore-expanding (step 2), which only consumes very small amount of pore-expanding agent (i.e. a solvent with a loss tangent greater than 0.174) to achieve excellent pore-expanding effect.

Preferably, the pore-expanding solution is an aqueous solution of a solvent with a loss tangent greater than 0.174.

Preferably, the aqueous solution volume concentration of the solvent is 1-9% when the loss tangent of the solvent is greater than 1.3, and the aqueous solution volume concentration of the solvent is 10-90% when the loss tangent of the solvent is less than 1.3.

Preferably, the solvent with a loss tangent greater than 0.174 is selected from ethylene glycol aqueous solution, ethanol aqueous solution, dimethyl sulfoxide aqueous solution, methanol aqueous solution or acetic acid aqueous solution.

Preferably, the concentration of the ethylene glycol aqueous solution, ethanol aqueous solution, dimethyl sulfoxide aqueous solution, methanol aqueous solution and acetic acid aqueous solution is 1-9%, 10-90%, 1-9%, 10-90% and 10-50%, respectively.

Preferably, the activating liquid is vanadate solution, tungstate solution or a mixture of vanadate solution and tungstate solution, in which the molar concentration of vanadium and tungsten is 0.01-0.4 mol/L and 0.1-2 mol/L, respectively.

Preferably, the bubbling in step (1) is pulse bubbling and the air source of bubbling is compressed air.

Preferably, the microwave power density and frequency in step (3) and (5) are 20-100 kW/m$^3$ and 2450 MHz, respectively.

A device for the method for regenerating a SCR denitration catalyst assisted by microwaves, comprising following units in serial connection: a bubbling cleaning unit, a pore-expanding impregnating unit, a first microwave treatment unit, an activating liquid impregnating unit, a second microwave treatment unit and a calcining unit; as well as mechanical manipulators transferring SCR denitration catalyst between adjacent units.

Preferably, the bubbling cleaning unit comprises a bubbling cleaning pool, a bubbler, an air compressor pump, a liftable and lowerable transmission belt, a deionized water supply pipe and a waste liquid discharge pipe, wherein the bubbler is positioned at a bottom of the bubbling cleaning pool and connected with the air compressor pump; the liftable and lowerable transmission belt is mounted in the bubbling cleaning pool; the deionized water supply pipe is connected to a top of the bubbling cleaning pool; and the waste liquid discharge pipe is connected to the bottom of the bubbling cleaning pool;

The pore-expanding impregnating unit comprises a pore-expanding solution impregnating pool, a liftable and lowerable transmission belt, a pore-expanding solution supply pipe and a waste liquid discharge pipe, wherein the liftable and lowerable transmission belt is mounted in the pore-expanding solution impregnating pool; the pore-expanding solution supply pipe is connected to a top of the pore-expanding solution impregnating pool; and the waste liquid discharge pipe is connected to a bottom of the pore-expanding solution impregnating pool;

Each of the first microwave treatment unit and the second microwave treatment unit comprises a liftable and lowerable microwave oven with a conveyor belt at the bottom;

The activating liquid impregnating unit comprises an activating liquid impregnating pool, an activating liquid supply pipe, a liftable and lowerable transmission belt and a waste liquid discharge pipe, wherein the liftable and lowerable transmission belt is mounted in the activating liquid impregnating pool; the activating liquid supply pipe is connected to a top of the activating liquid impregnating pool; and the waste liquid discharge pipe is connected to a bottom of the activating liquid impregnating pool;

The calcining unit comprises a calcinator.

With this device, the catalyst can be directly lifted, lowered and conveyed to each container via transmission belts, and then conveniently transferred to target containers via mechanical manipulators, thus optimizing the regeneration process.

Beneficial effects of the present invention: the catalyst treated by the method of the present invention has loose pore channels, obviously optimized pore structures and significantly improved catalyst surface conditions. Besides, the present invention has readily available raw materials, is simple and energy-saving in device and process, and is suitable for industrial scale regeneration. Moreover, the operability and non-airtightness of the microwave oven in the present invention reduce the dangers; energy consumption is greatly reduced due to pore-expanding solution treatment for 10-30 minutes and microwave treatment for 1-10 minutes, since the catalyst is taken out after pore-expanding solution treatment for microwave treatment with very little pore-expanding solution consumption and dusts have been cleaned with water, only requiring appropriate supplementation of pore-expanding agent instead of frequent evacuation; and impregnating method is used during activation to avoid waste of activating liquid and the 1-20 minutes drying method with microwave oven not only shortens the drying time, but also saves energy.

In the figure: 1. bubbling cleaning pool, 2. bubbler, 3. air compressor pump, 4. liftable and lowerable transmission belt, 5. deionized water supply pipe, 6. waste liquid discharge pipe, 7. pore-expanding solution impregnating pool, 8. pore-expanding solution supply pipe, 9. liftable and lowerable microwave oven, 10. activating liquid impregnating pool, 11. activating liquid supply pipe, 12. calcinator, 13. Mechanical manipulator, 14. SCR denitration catalyst

DESCRIPTION OF THE PREFERRED EMBODIMENTS

The Technical solution to the present invention will be further described next with reference to specific embodiments and drawings.

Unless otherwise particularly specified, raw materials and equipment used in the present invention can be purchased from the market or are commonly used in this field, and methods in the following examples are conventional methods in this field.

SCR: Selective Catalytic Reduction Method

Figure 2:
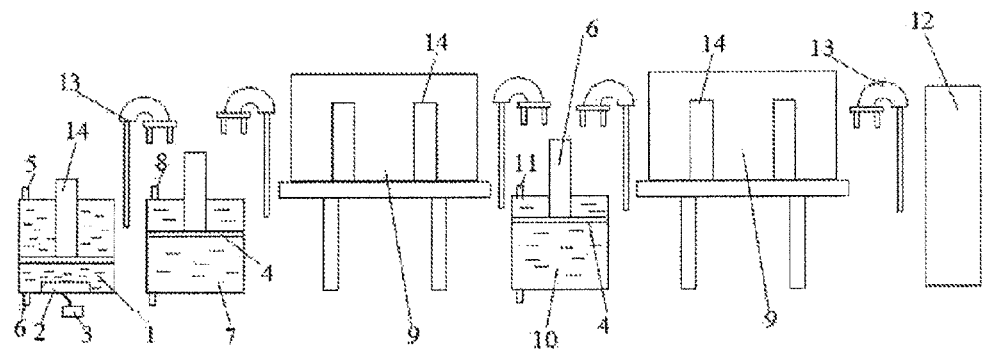
FIG. 2 shows the structure diagram of the device for the method for regenerating a SCR denitration catalyst assisted by microwaves in the present invention.

The structure of the device in the present invention comprises (see FIG. 2): a bubbling cleaning unit, a pore-expanding impregnating unit, a first microwave treatment unit, an activating liquid impregnating unit, a second microwave treatment unit and a calcining unit, which are serially connected; as well as mechanical manipulators 13 transferring SCR denitration catalyst 14 between adjacent units.

The bubbling cleaning unit comprises a bubbling cleaning pool 1, a bubbler 2 (pulse bubbler), an air compressor pump 3, a liftable and lowerable transmission belt 4, a deionized water supply pipe 5 and a waste liquid discharge pipe 6, wherein the bubbler 2 is positioned at bottom of the bubbling cleaning pool 1 and connected with the air compressor pump 3; the liftable and lowerable transmission belt 4 is mounted in the bubbling cleaning pool 1; the deionized water supply pipe 5 is connected to top of the bubbling cleaning pool 1; and the waste liquid discharge pipe 6 is connected to bottom of the bubbling cleaning pool 1.

The pore-expanding impregnating unit comprises a pore-expanding solution impregnating pool 7, a liftable and lowerable transmission belt 4, a pore-expanding solution supply pipe 8 and a waste liquid discharge pipe 6, wherein the liftable and lowerable transmission belt is mounted in the pore-expanding solution impregnating pool 7; the pore-expanding solution supply pipe 8 is connected to a top of the pore-expanding solution impregnating pool 7; and the waste liquid discharge pipe is connected to a bottom of the pore-expanding solution impregnating pool 7.

Both the first microwave treatment unit and the second microwave treatment unit comprise a liftable and lowerable microwave oven 9 with a conveyor belt at the bottom.

The activating liquid impregnating unit comprises an activating liquid impregnating pool 10, an activating liquid supply pipe 11, a liftable and lowerable transmission belt and a waste liquid discharge pipe, wherein the liftable and lowerable transmission belt is mounted in the activating liquid impregnating pool; the activating liquid supply pipe is connected to a top of the activating liquid impregnating pool; and the waste liquid discharge pipe is connected to a bottom of the activating liquid impregnating pool.

The calcining unit comprises a calcinator 12.

Figure 1:
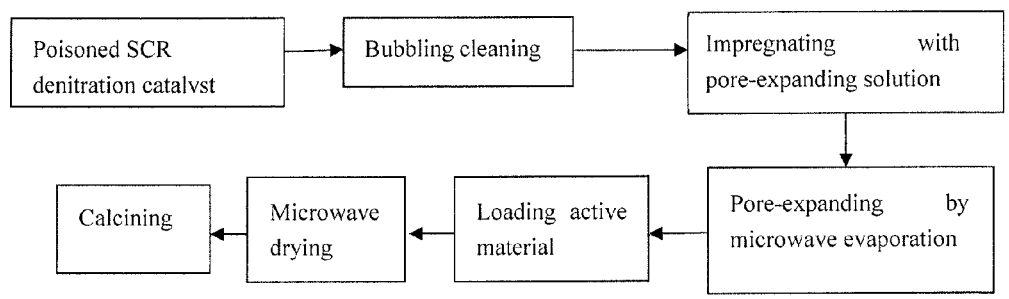
FIG. 1 shows the process flow diagram of the present invention.

FIG. 1 shows the process flow diagram of the present invention:

(1) A poisoned SCR denitration catalyst is immersed in deionized water, and the SCR denitration catalyst is cleaned by a bubbling method for 10-30 minutes with a pulse bubbler with air source of compressed air.
(2) The SCR denitration catalyst from step (1) is transferred to a container containing a pore-expanding solution for a soaking treatment for 10-30 minutes; the pore-expanding solution is an aqueous solution of a solvent with a loss tangent greater than 0.174; the aqueous solution volume concentration of the solvent is 1-9% when the loss tangent of the solvent is greater than 1.3, and the aqueous solution volume concentration of the solvent is 10-90% when the loss tangent of the solvent is less than 1.3; the solvent with the loss tangent greater than 0.174 is selected from ethylene glycol aqueous solution, ethanol aqueous solution, dimethyl sulfoxide aqueous solution, methanol aqueous solution or acetic acid aqueous solution; and concentration of the ethylene glycol aqueous solution, ethanol aqueous solution, dimethyl sulfoxide aqueous solution, methanol aqueous solution and acetic acid aqueous solution is 1-9%, 10-90%, 1-9%, 10-90% and 10-50%, respectively.
(3) The SCR denitration catalyst from step (2) is transferred to a microwave device and treated for 1-10 minutes; and the microwave power density and frequency are 20-100 $kW/m^3$ and 2450 MHz respectively.
(4) The SCR denitration catalyst from step (3) is transferred to a container with an activating liquid and impregnated for 1-4 hours; and the activating liquid is vanadate solution, tungstate solution or a mixture of vanadate solution and tungstate solution, in which the molar concentration of vanadium and tungsten is 0.01-0.4 mol/L and 0.1-2 mol/L respectively.
(5) The SCR denitration catalyst from step (4) is transferred to a microwave device for drying for 1-20 minutes; and the microwave power density and frequency are 20-100 $kW/m^3$ and 2450 MHz respectively.
(6) The SCR denitration catalyst from step (5) is transferred to a calcining device for calcination under conditions of 500-600° C. for 4-7 hours.

EXAMPLE 1

A 150 mm*150 mm*600 mm cellular poisoned (inactive) SCR denitration catalyst was put on the liftable and lowerable transmission belt which descends and the SCR denitration catalyst was immersed in the bubbling cleaning pool containing 2 L deionized water for bubbling cleaning for 20 minutes and then the SCR denitration catalyst was ascended and transferred to a side of the pore-expanding solution impregnating pool; then, the mechanical manipulator transferred the SCR denitration catalyst onto the liftable and lowerable transmission belt in the pore-expanding solution impregnating pool which descended and made the SCR denitration catalyst immersed in 2 L methanol aqueous solution with volume concentration of 70% for 30 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 100 $kW/m^3$ and frequency of 2450 MHz; and then part of the sample was sieved into 40-60 mesh particles and powders for use.

Performance Test:

0.1 g regenerated catalyst powder sample was prepared in the above example 1 in a physical/chemical adsorption instrument for BET specific surface area test. Such test was conducted on an instrument Autosorb-1-c manufactured by Quantachrome. BET results showed that such cellular regenerated SCR denitration catalyst had a specific surface area of 55.47 $m^2/g$, a total pore volume of 0.24 ml/g and an average pore diameter of 14.43 nm, and these three values of untreated fresh SCR denitration catalyst sample were 46.98 $m^2/g$, 0.22 ml/g and 16.27 nm respectively on equal conditions. BET analysis results indicated that the pore volume of cellular regenerated SCR denitration catalyst under 10 nm increased by 20%. Thus it can be seen that the specific surface area and the total pore volume of catalyst was increased after the aforesaid regenerating treatment, which whelped improve the denitration activity of catalyst.

EXAMPLE 2

A 150 mm*150 mm*600 mm cellular poisoned SCR denitration catalyst was put on the liftable and lowerable transmission belt which descended and made the SCR denitration catalyst immersed in the bubbling cleaning pool containing 2 L deionized water for bubbling cleaning for 10 minutes and then ascended and transferred the SCR denitration catalyst to side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L methanol aqueous solution with volume concentration of 70% for 10 minutes and then ascended and transferred the SCR denitration catalyst to side of the liftable and lowerable microwave oven of the first microwave treatment unit; then, the manipulator transferred the SCR denitration catalyst into the liftable and lowerable microwave oven for treatment for 10 minutes under microwave power density of 20 kW/m$^3$ and frequency of 2450 MHz; and then part of the sample was sieved into 40-60 mesh particles and powders for use.

Performance Test:

0.1 g regenerated catalyst powder sample prepared in the above example 2 was put in a physical/chemical adsorption instrument for BET specific surface area test. Such test was conducted on an instrument Autosorb-1-c manufactured by Quantachrome. BET results showed that such cellular regenerated SCR denitration catalyst had a specific surface area of 52.57 m$^2$/g, a total pore volume of 0.22 ml/g and an average pore diameter of 13.23 nm, and these three values of untreated fresh SCR denitration catalyst sample were 46.98 m$^2$/g, 0.22 ml/g and 16.27 nm respectively on equal conditions. BET analysis results indicated that the pore volume of cellular regenerated SCR denitration catalyst under 10 nm increases by 18%. Thus it can be seen that the specific surface area and the total pore volume of catalyst was increased after the aforesaid regenerating treatment, which will helped improve the denitration activity of catalyst.

EXAMPLE 3

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 30 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descends and makes the SCR denitration catalyst immersed in 2 L methanol aqueous solution with volume concentration of 70% for 20 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 28 kW/m$^3$ and frequency of 2450 MHz; and then part of the sample was sieved into 40-60 mesh particles and powders for use.

Performance Test:

0.1 g regenerated catalyst powder sample prepared in the above example 3 was put in a physical/chemical adsorption instrument for BET specific surface area test. Such test was conducted on an instrument Autosorb-1-c manufactured by Quantachrome. BET results showed that such cellular regenerated SCR denitration catalyst had a specific surface area of 56.57 m$^2$/g, a total pore volume of 0.25 ml/g and an average pore diameter of 13.73 nm, and these three values of untreated fresh SCR denitration catalyst sample were 46.98 m$^2$/g, 0.22 ml/g and 16.27 nm respectively on equal conditions. BET analysis results indicated that the pore volume of cellular regenerated SCR denitration catalyst under 10 nm increases by 20%. Thus it can be seen that the specific surface area and the total pore volume of catalyst was increased after the aforesaid regenerating treatment, which helped improve the denitration activity of catalyst.

EXAMPLE 4

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L ethylene glycol aqueous solution with volume concentration of 6% for 30 minutes and then ascended and transferred the SCR denitration catalyst to side of the liftable and lowerable microwave oven of the first microwave treatment unit; then, the manipulator transferred the SCR denitration catalyst into the liftable and lowerable microwave oven for treatment for 10 minutes under microwave power density of 38 kW/m$^3$ and frequency of 2450 MHz; and then part of the sample was sieved into 40-60 mesh particles and powders for use.

Performance Test:

0.1 g regenerated catalyst powder sample prepared in the above example 4 was put in a physical/chemical adsorption instrument for BET specific surface area test. Such test was conducted on an instrument Autosorb-1-c manufactured by Quantachrome. BET results showed that such cellular regenerated SCR denitration catalyst had a specific surface area of 60.58 m$^2$/g, a total pore volume of 0.25 ml/g and an average pore diameter of 15.33 nm, and these three values of untreated fresh SCR denitration catalyst sample were 46.98 m$^2$/g, 0.22 ml/g and 16.27 nm respectively on equal conditions. BET analysis results indicated that the pore volume of cellular regenerated SCR denitration catalyst under 10 nm increases by 30%. Thus it can be seen that the specific surface area and the total pore volume of catalyst was increased after the aforesaid regenerating treatment, which helped improve the denitration activity of catalyst.

EXAMPLE 5

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then ascended and transferred the SCR denitration catalyst to side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L ethanol aqueous solution with volume concentration of 50% for 30 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 38 kW/m³ and frequency of 2450 MHz; and then part of the sample was sieved into 40-60 mesh particles and powders for use.

Performance Test:

0.1 g regenerated catalyst powder sample prepared in the above example 5 was put in a physical/chemical adsorption instrument for BET specific surface area test. Such test was conducted on an instrument Autosorb-1-c manufactured by Quantachrome. BET results showed that such cellular regenerated SCR denitration catalyst had a specific surface area of 66.8 m²/g, a total pore volume of 0.28 ml/g and an average pore diameter of 13.2 nm, and these three values of untreated inactive SCR denitration catalyst sample were 45.35 m²/g, 0.26 ml/g and 15.6 nm respectively. Thus it can be seen that the specific surface area and the total pore volume of catalyst was increased after the aforesaid regenerating treatment, which helped improve the denitration activity of catalyst.

0.2 g regenerated catalyst particle sample prepared in the above example 5 was put in a catalyst activity evaluation device to test its denitration efficiency and the denitration efficiency increased to 63% under 320° C., while the denitration efficiency of inactive catalyst was only 39% under 320° C. Comparing with the Chinese patent CN1686607A (see Table 1), with the method of the present invention, the pore-expanding effect was significantly improved with greatly shortened treatment time and greatly reduced consumption of pore-expanding agent.

TABLE 1

Comparison of Pore-expanding Effect in the Present Invention and the Chinese Patent CN1686607 A

|  | Example 1 in the Chinese Patent CN1686607 A | Method of the Present Invention |
|---|---|---|
| Increase in specific surface area m²/g | 8.1 | 21.45 |
| Original specific surface area m²/g | 65.1 | 40.35 |
| Increase scale of specific surface area % | 12.4 | 53.2 |
| Treatment time and solution consumption | Immersion in deionized water for 2 h and ethanol treatment under 275° C. | Impregnation in ethanol aqueous solution for 30 minutes and microwave treatment for 10 min after taking out |

EXAMPLE 6

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 30 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L ethanol aqueous solution with volume concentration of 90% for 10 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 1 minutes under microwave power density of 38 kW/m³ and frequency of 2450 MHz; and then the conveyor belt in the microwave oven transferred the SCR denitration catalyst to a side of the activating liquid impregnating pool and the manipulator transferred the SCR denitration catalyst onto the liftable and lowerable transmission belt in the activating liquid impregnating pool with a number of 6-1.

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 30 minutes and then directly transferred into the activating liquid impregnating pool with a number of 6-2.

Two pieces of catalyst were immersed in a mixture of 0.01 mol/L ammonium metavanadate and 1.5 mol/L ammonium metatungstate for 1 hour.

The liftable and lowerable transmission belt ascended and transferred the SCR denitration catalyst 6-1 to a side of the liftable and lowerable microwave oven of the second microwave treatment unit; then, the manipulator transferred the SCR denitration catalyst 6-1 into the microwave oven for drying for 1 minute under microwave power density of 38 kW/m³ and frequency of 2450 MHz; and the SCR denitration catalyst 6-2 was put into a vertical air dry oven for drying for 2 hours under 110° C.

The two pieces of catalyst was calcined for 5 hours under 500° C. and the sample obtained was sieved into 40-60 mesh particles and powders for use.

Performance Test:

0.2 g regenerated catalyst particle sample prepared in the above example 6 was put in a catalyst activity evaluation device to test its denitration efficiency and the denitration efficiency of 6-1 and 6-2 increases by 35% and 20% respectively under 320° C.

EXAMPLE 7

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L ethylene glycol aqueous solution with volume concentration of 1% for 30 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 100 kW/m³ and frequency of 2450 MHz; and then the conveyor belt in the microwave oven transferred the SCR denitration catalyst to side of the activating liquid impregnating pool and the manipulator transferred the SCR denitration catalyst onto the liftable and lowerable transmission belt in the activating liquid impregnating pool with a number of 7-1.

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then directly transferred into the activating liquid impregnating pool with a number of 7-2.

Two pieces of catalyst were immersed in a mixture of 0.05 mol/L ammonium metavanadate and 2 mol/L ammonium metatungstate for 3 hours.

The liftable and lowerable transmission belt ascended and transferred the SCR denitration catalyst 7-1 to a side of the liftable and lowerable microwave oven of the second microwave treatment unit; then, the manipulator transferred the SCR denitration catalyst 7-1 into the microwave oven for drying for 10 minutes under microwave power density of 38 kW/m$^3$ and frequency of 2450 MHz; and the SCR denitration catalyst 7-2 was put into a vertical air dry oven for drying for 2 hours under 110° C.

The two pieces of catalyst were calcined for 7 hours under 500° C. and the sample obtained was sieved into 40-60 mesh particles and powders for use.

Performance Test:

0.2 g regenerated catalyst particle sample prepared in the above example 7 was put in a catalyst activity evaluation device to test its denitration efficiency and the denitration efficiency of 7-1 and 7-2 increased by 39% and 23%, respectively.

EXAMPLE 8

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L dimethyl sulfoxide aqueous solution with volume concentration of 9% for 30 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 100 kW/m$^3$ and frequency of 2450 MHz; and then the conveyor belt in the microwave oven transferred the SCR denitration catalyst to side of the activating liquid impregnating pool and the manipulator transferred the SCR denitration catalyst onto the liftable and lowerable transmission belt in the activating liquid impregnating pool with a number of 8-1.

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then directly transferred into the activating liquid impregnating pool with a number of 8-2.

Two pieces of catalyst were put in a mixture of 0.01 mol/L ammonium metavanadate and 2 mol/L ammonium metatungstate for 4 hours.

The liftable and lowerable transmission belt ascended and transferred the SCR denitration catalyst 8-1 to a side of the liftable and lowerable microwave oven of the second microwave treatment unit; then, the manipulator transferred the SCR denitration catalyst 8-1 into the microwave oven for drying for 20 minutes under microwave power density of 28 kW/m$^3$ and frequency of 2450 MHz; and the SCR denitration catalyst 8-2 was put into a vertical air dry oven for drying for 2 hours under 110° C.

The two pieces of catalyst were calcined for 4 hours under 600° C. and the sample obtained was sieved into 40-60 mesh particles and powders for use.

Performance Test:

0.2 g regenerated catalyst particle sample prepared in the above example 8 was put in a catalyst activity evaluation device to test its denitration efficiency and the denitration efficiency of 8-1 and 8-2 increases by 37% and 22%, respectively.

EXAMPLE 9

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 30 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L acetic acid aqueous solution with volume concentration of 50% for 30 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 100 kW/m$^3$ and frequency of 2450 MHz; and then the conveyor belt in the microwave oven transferred the SCR denitration catalyst to a side of the activating liquid impregnating pool and the manipulator transferred the SCR denitration catalyst onto the liftable and lowerable transmission belt in the activating liquid impregnating pool with a number of 9-1.

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 30 minutes and then directly transferred into the activating liquid impregnating pool with a number of 9-2.

Two pieces of catalyst were put in 0.2 mol/L ammonium metavanadate for 4 hours.

The liftable and lowerable transmission belt ascended and transferred the SCR denitration catalyst 9-1 to a side of the liftable and lowerable microwave oven of the second microwave treatment unit; then, the manipulator transferred the SCR denitration catalyst 9-1 into the microwave oven for drying for 10 minutes under microwave power density of 20 kW/m$^3$ and frequency of 2450 MHz; and the SCR denitration catalyst 9-2 was put into a vertical air dry oven for drying for 2 hours under 110° C.

The two pieces of catalyst were calcined for 6 hours under 600° C. and the sample obtained was sieved into 40-60 mesh particles and powders for use.

Performance Test:

0.2 g regenerated catalyst particle sample prepared in the above example 9 was put in a catalyst activity evaluation device to test its denitration efficiency and the denitration efficiency of 9-1 and 9-2 increased by 37% and 21%, respectively.

EXAMPLE 10

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then ascended and transferred the SCR denitration catalyst to a side of the pore-expanding solution impregnating pool; then, the manipulator transferred the SCR denitration catalyst onto the liftable and lowerable transmission belt in the pore-expanding solution impregnating pool which descended and made the SCR denitration catalyst immersed in 2 L ethanol aqueous solution with volume concentration of 10% for 30 minutes and then ascended and transferred the SCR denitration catalyst to a side of the liftable and lowerable microwave oven of the first microwave treatment unit; then, the manipulator transferred the SCR denitration catalyst into the liftable and lowerable microwave oven for treatment for 10 minutes under microwave power density of 100 kW/m$^3$ and frequency of 2450 MHz; and then the conveyor belt in the microwave oven transferred the SCR denitration catalyst to a side of the activating liquid impregnating pool and the manipulator transferred the SCR denitration catalyst onto the liftable and lowerable transmission belt in the activating liquid impregnating pool with a number of 10-1.

A 150 mm*150 mm*600 mm cellular poisoned (inactive) SCR denitration catalyst was put on the liftable and lowerable transmission belt which descended and made the SCR denitration catalyst immersed in the bubbling cleaning pool containing 2 L deionized water for bubbling cleaning for 20 minutes and then directly transferred into the activating liquid impregnating pool with a number of 10-2.

Two pieces of catalyst were immersed in 1 mol/L ammonium metatungstate for 4 hours.

The liftable and lowerable transmission belt ascended and transferred the SCR denitration catalyst 10-1 to side of the liftable and lowerable microwave oven of the second microwave treatment unit; then, the manipulator transferred the SCR denitration catalyst 10-1 into the microwave oven for drying for 10 minutes under microwave power density of 100 kW/m$^3$ and frequency of 2450 MHz; and the SCR denitration catalyst 10-2 was put into a vertical air dry oven for drying for 2 hours under 110° C.

The two pieces of catalyst were calcined for 5 hours under 600° C. and the sample obtained was sieved into 40-60 mesh particles and powders for use.

Performance Test:

0.2 g regenerated catalyst particle sample prepared in the above example 10 was put in a catalyst activity evaluation device to test its denitration efficiency and the denitration efficiency of 10-1 and 10-2 increased by 39% and 23%, respectively.

The aforesaid examples are just a better scheme for the present invention, instead of any form of limitation, and other variants and versions are allowed on the premise of not exceeding the technical solution recorded in the claims.

The invention claimed is:

1. A method for regenerating a selective catalytic reduction (SCR) denitration catalyst assisted by microwaves, comprising:

(1) immersing a poisoned SCR denitration catalyst in deionized water, and cleaning the SCR denitration catalyst by a bubbling method for 10-30 minutes;
(2) transferring the SCR denitration catalyst from step (1) to a container containing a pore-expanding solution and conducting a soaking treatment for 10-30 minutes;
(3) transferring the SCR denitration catalyst from step (2) to a microwave device and treating the SCR denitration catalyst by microwave for 1-10 minutes;
(4) transferring the SCR denitration catalyst from step (3) to a container with an activating liquid and impregnating the SCR denitration catalyst for 1-4 hours;
(5) transferring the SCR denitration catalyst from step (4) to a microwave device and drying the SCR denitration catalyst for 1-20 minutes;
(6) transferring the SCR denitration catalyst from step (5) to a calcining device and calcining the SCR denitration catalyst under conditions of 500-600° C. for 4-7 hours.

2. The method according to claim 1, wherein the pore-expanding solution is an aqueous solution of a solvent with a loss tangent greater than 0.174.

3. The method according to claim 2, wherein the aqueous solution volume concentration of the solvent is 1-9% when the loss tangent of the solvent is greater than 1.3, and the aqueous solution volume concentration of the solvent is 10-90% when the loss tangent of the solvent is less than 1.3.

4. The method according to claim 2, wherein the solvent with the loss tangent greater than 0.174 is selected from ethylene glycol aqueous solution, ethanol aqueous solution, dimethyl sulfoxide aqueous solution, methanol aqueous solution or acetic acid aqueous solution.

5. The method according to claim 4, wherein concentration of the ethylene glycol aqueous solution, ethanol aqueous solution, dimethyl sulfoxide aqueous solution, methanol aqueous solution and acetic acid aqueous solution is 1-9%, 10-90%, 1-9%, 10-90% and 10-50%, respectively.

6. The method according to claim 1, wherein the activating liquid is vanadate solution, tungstate solution or a mixture of vanadate solution and tungstate solution, in which the molar concentration of vanadium and tungsten is 0.01-0.4 mol/L and 0.1-2 mol/L, respectively.

7. The method according to claim 1, wherein the bubbling in step (1) is pulse bubbling and the air source of bubbling is compressed air.

8. The method according to claim 1, wherein the microwave power density and frequency in step (3) and (5) are 20-100 kW/m$^3$ and 2450 MHz, respectively.

9. A device for the method in claim 1, wherein the device comprises following units in a serial connection: a bubbling cleaning unit, a pore-expanding impregnating unit, a first microwave treatment unit, an activating liquid impregnating unit, a second microwave treatment unit and a calcining unit; as well as manipulators transferring SCR denitration catalyst between adjacent units.

10. The device according to claim 9, wherein the bubbling cleaning unit comprises a bubbling cleaning pool, a bubbler, an air compressor pump, a liftable and lowerable transmission belt, a deionized water supply pipe and a waste liquid discharge pipe, wherein the bubbler is positioned at bottom of the bubbling cleaning pool and connected with the air compressor pump; the liftable and lowerable transmission belt is mounted in the bubbling cleaning pool; the deionized water supply pipe is connected to a top of the bubbling cleaning pool; and the waste liquid discharge pipe is connected to a bottom of the bubbling cleaning pool;

the pore-expanding impregnating unit comprises a pore-expanding solution impregnating pool, a liftable and lowerable transmission belt, a pore-expanding solution supply pipe and a waste liquid discharge pipe, wherein the liftable and lowerable transmission belt is mounted in the pore-expanding solution impregnating pool; the pore-expanding solution supply pipe is connected to a top of the pore-expanding solution impregnating pool; and the waste liquid discharge pipe is connected to a bottom of the pore-expanding solution impregnating pool;

both the first microwave treatment unit and the second microwave treatment unit comprise a liftable and lowerable microwave oven with a conveyor belt at the bottom;

the activating liquid impregnating unit comprises an activating liquid impregnating pool, an activating liquid supply pipe, a liftable and lowerable transmission belt and a waste liquid discharge pipe, wherein the liftable and lowerable transmission belt is mounted in the activating liquid impregnating pool; the activating liquid supply pipe is connected to a top of the activating liquid impregnating pool; and the waste liquid discharge pipe is connected to a bottom of the activating liquid impregnating pool;

the calcining unit comprises a calcinator.

11. The method according to claim 3, wherein the solvent with the loss tangent greater than 0.174 is selected from ethylene glycol aqueous solution, ethanol aqueous solution, dimethyl sulfoxide aqueous solution, methanol aqueous solution or acetic acid aqueous solution.

12. The method according to claim 2, wherein the activating liquid is vanadate solution, tungstate solution or a mixture of vanadate solution and tungstate solution, in which the molar concentration of vanadium and tungsten is 0.01-0.4 mol/L and 0.1-2 mol/L, respectively.

13. The method according to claim 2, wherein the bubbling in step (1) is pulse bubbling and the air source of bubbling is compressed air.

14. The method according to claim 2, wherein the microwave power density and frequency in step (3) and (5) are 20-100 kW/m$^3$ and 2450 MHz, respectively.

15. The method according to claim 3, wherein the activating liquid is vanadate solution, tungstate solution or a mixture of vanadate solution and tungstate solution, in which the molar concentration of vanadium and tungsten is 0.01-0.4 mol/L and 0.1-2 mol/L, respectively.

16. The method according to claim 3, wherein the bubbling in step (1) is pulse bubbling and the air source of bubbling is compressed air.

17. The method according to claim 3, wherein the microwave power density and frequency in step (3) and (5) are 20-100 kW/m$^3$ and 2450 MHz, respectively.

* * * * *